United States Patent
Gershfeld et al.

(10) Patent No.: US 10,927,532 B1
(45) Date of Patent: Feb. 23, 2021

(54) FOOT PEDAL FOR ACTUATING A WATER FAUCET VALVE

(71) Applicants: Saveliy Aleksandrovich Gershfeld, Placentia, CA (US); Jack Gershfeld, Fullerton, CA (US)

(72) Inventors: Saveliy Aleksandrovich Gershfeld, Placentia, CA (US); Jack Gershfeld, Fullerton, CA (US)

(*) Notice: Subject to any disclaimer, the term of this patent is extended or adjusted under 35 U.S.C. 154(b) by 0 days.

(21) Appl. No.: 16/535,781

(22) Filed: Aug. 8, 2019

(51) Int. Cl.
*E03C 1/05* (2006.01)
*F16K 31/62* (2006.01)

(52) U.S. Cl.
CPC .............. *E03C 1/052* (2013.01); *F16K 31/62* (2013.01)

(58) Field of Classification Search
CPC .................................. E03C 1/052; F16K 31/62
See application file for complete search history.

(56) References Cited

U.S. PATENT DOCUMENTS

| | | | | |
|---|---|---|---|---|
| 2,268,699 A * | 1/1942 | Cotner | ................. | B23B 31/302 |
| | | | | 74/526 |
| 2,693,716 A * | 11/1954 | Ludwig | ................. | F16K 31/62 |
| | | | | 74/512 |
| 5,199,119 A * | 4/1993 | Weber | ................. | E03C 1/052 |
| | | | | 251/295 |
| 5,386,600 A * | 2/1995 | Gilbert, Sr. | ............. | F16K 31/62 |
| | | | | 251/101 |
| 8,397,753 B2 * | 3/2013 | Houghton | ............... | F16K 31/62 |
| | | | | 137/607 |
| 9,395,017 B2 * | 7/2016 | Waller | .................... | F16K 31/62 |
| 9,534,697 B2 * | 1/2017 | Patterson | ............... | F16K 7/063 |
| 10,221,958 B1 * | 3/2019 | Shane | .................. | F16K 31/088 |
| 2006/0202141 A1 * | 9/2006 | Perlstein | ................ | E03C 1/052 |
| | | | | 251/61.1 |
| 2011/0062359 A1 * | 3/2011 | Zelikovich | .............. | E03C 1/052 |
| | | | | 251/129.04 |
| 2014/0131604 A1 * | 5/2014 | Walker | .................... | F16K 31/62 |
| | | | | 251/213 |
| 2015/0361644 A1 * | 12/2015 | Warsowe | ............. | F16K 27/041 |
| | | | | 137/603 |
| 2018/0292024 A1 * | 10/2018 | Clark | ..................... | A61C 17/08 |

* cited by examiner

*Primary Examiner* — Marina A Tietjen
(74) *Attorney, Agent, or Firm* — Vladi Khiterer

(57) ABSTRACT

A foot pedal for actuating a water faucet valve can be selectively placed from a rest position to either a pushed position or a locked position by way of depressing the foot pedal at different locations on the foot pedal. In the rest position, the water faucet valve is closed. In the pushed position, the water faucet valve is open as long as the user continues depressing the foot pedal. In the locked position, the water faucet valve is open without the user continuously depressing the foot pedal.

6 Claims, 7 Drawing Sheets

FOOT PEDAL FOR ACTUATING A WATER FAUCET VALVE

FIELD OF THE INVENTION

This invention pertains to a mechanism for controlling water flow from a faucet with a foot pedal.

SUMMARY OF THE INVENTION

Conventional water faucet valves are hand operated. However, it may sometimes be desirable to operate water faucet valves by way of a foot pedal, so as to free up a user's hands for other tasks while water is turned on and off by the user's foot. It may sometimes also be desirable to have different foot-operated u) modes of water flow, i.e. the "off", the continuous water flow and the water flow only when the foot pedal is depressed by the user. Moreover, it is desirable for the mechanism for controlling water flow from a faucet with a foot pedal to be adjustable to accommodate the user's installation space.

A foot pedal for actuating a water faucet valve according to this invention is satisfies all these needs. Specifically, the foot pedal can be selectively placed from a rest position to either a pushed position or a locked position by way of depressing the foot pedal at different locations on the foot pedal. In the rest position, the water faucet valve is closed. In the pushed position, the water faucet valve is open as long as the user continues depressing the foot pedal. In the locked position, the water faucet valve is open without the user continuously depressing the foot pedal.

Moreover, the foot pedal according to this invention has an adjustable top plate, as well as top and bottom housings that permit adjusting their relative vertical positions. As such, the foot pedal according to this invention offers flexibility of installation in various installation spaces.

BRIEF DESCRIPTION OF THE DRAWINGS

FIG. 3 shows, in the lower portion thereof, a side view of the foot pedal according to this invention in the rest position.

FIG. 5 shows, in the lower portion thereof, a side view of the foot pedal according to this invention in the pushed position.

FIG. 7 shows, in the lower portion thereof, a side view of the foot pedal according to this invention in the locked position.

DETAILED DESCRIPTION OF THE PREFERRED EMBODIMENT

Figure 1:
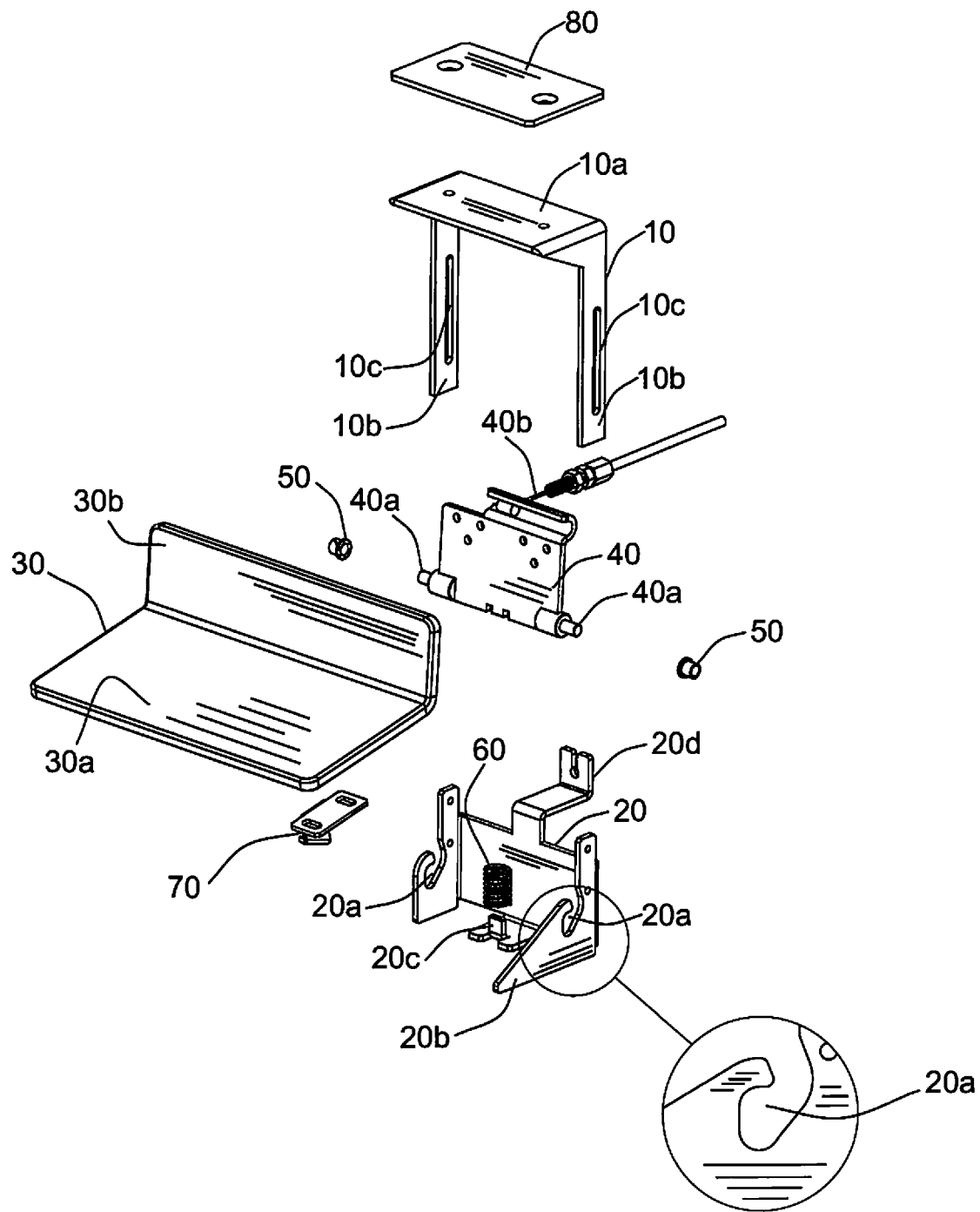
FIG. 1 is an isometric view of the foot pedal according to this invention in a disassembled condition.

Viewing FIG. 1, numeral 10 indicates a top housing. Top Housing 10 comprises a horizontal plate indicated by numeral 10a and two vertical legs indicated by numeral 10b. Legs 10b are of rectangular shape and are disposed on either end of Horizontal Plate 10a. Numeral 10c indicates an elongated opening. One Elongated Opening 10c is disposed vertically on each Leg 10b.

In the preferred embodiment described in reference to FIG. 1, Top Housing 10 is made from sheet steel. However, it can be made from other materials, including aluminum and plastic.

Still viewing FIG. 1, numeral 20 indicates a bottom housing. Bottom Housing 20 comprises a rectangular vertically oriented base plate comprising top and bottom edges and first and second vertical edges. The first vertical edge is shown in FIG. 1 on the left side of the base plate.

There is provided a first wing member disposed on the first vertical edge and a second wing member disposed on the second vertical edge. First and second wing members are disposed perpendicularly to the base plate.

Numeral 20a indicates a slot. Two aligned vertically oriented open-ended Slots 20a are disposed in the first and second wing members.

The second wing member forms a catch indicated by numeral 20b.

Numeral 20c indicates a spring support. Spring Support 20c is disposed on the bottom edge. Numeral 20d indicates a valve control cable support. Valve Control Cable Support 20d is disposed on the top edge.

In the preferred embodiment described in reference to FIG. 1, Bottom Housing 20 is made from sheet steel. However, it can be made from other materials, including aluminum and plastic.

Still viewing FIG. 1, numeral 30 indicates a foot pedal. Foot Pedal 30 comprises a long side indicated by numeral 30a and a short side indicated by numeral 30b. Short Side 30b is disposed perpendicularly to Long Side 30a.

Numeral 40 indicates a pedal support plate. Pedal Support Plate 40 comprises top and bottom portions. Numeral 40a indicates a pivot pin. Pivot Pin 40a is disposed on the bottom portion of Pedal Support Plate 40. Numeral 40b indicates a valve control cable. Valve Control Cable 40b is affixed to the top portion of Pedal Support Plate 40.

In the preferred embodiment described in reference to FIG. 1, Pedal Support Plate 40 is made from sheet steel. However, it can be made from other materials, including aluminum and plastic.

Numeral 50 indicates a bushing. When the foot pedal according to this invention is fully assembled, Pivot Pin 40a is inserted into Bushings 50, one Bushing 50 on each end of Pivot Pin 40a. In the preferred embodiment described in reference to FIG. 1, Bushings 50 are made of plastic.

Each Slot 20a receives Bushing 50 during assembly through the open-ended portion thereof. Thereafter, Legs 10b are affixed to the first and second wing members, such that Legs 10b partially cover the open-ended portions of Slots 20a, thus forming vertically oriented closed slots, better viewed at the lower portions of FIGS. 3, 5 and 7.

When the foot pedal according to this invention is fully assembled, Short Side 30b is fixedly attached to Pedal Support Plate 40 for pivotal movement of Foot Pedal 30 about Pivot Pin 40a. Long Side 30a is adapted for depressing and releasing Foot Pedal 30 with the user's foot, such that Short Side 30b pulls and releases Valve Control Cable 40*b*. The other end of Valve Control Cable 40*b* is affixed to a water faucet valve. Accordingly, depressing and releasing Foot Pedal 30 causes opening and closing the water faucet valve.

Numeral 60 indicates a spring. Spring 60 is disposed on Spring Support 20*c*. When the foot pedal according to this invention is fully assembled, Spring 60 abuts the bottom portion of Pedal Support Plate 40. There are two notches provided on the bottom portion of Pedal Support Plate 40 receiving Spring 60.

Spring 60 biases Foot Pedal 30 towards a rest position when the water faucet valve is closed. Spring 60 also permits a rocking motion of Foot Pedal 30 in the horizontal plane about Spring 60, said rocking motion limited by the travel of Bushings 50 inside Slots 20*a*.

Figure 2:
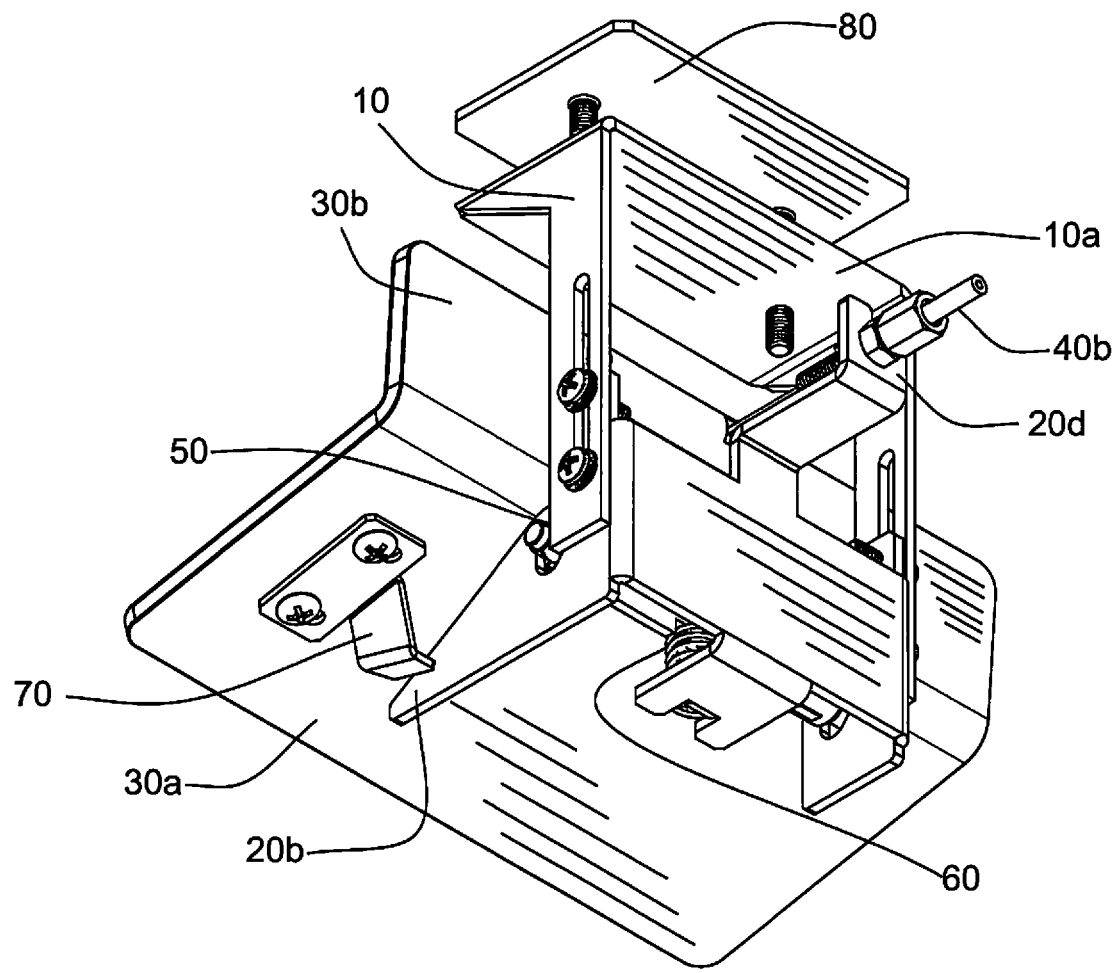
FIG. 2 is an isometric view of the foot pedal according to this invention, viewing from the bottom thereof, in a rest position.
Figure 4:
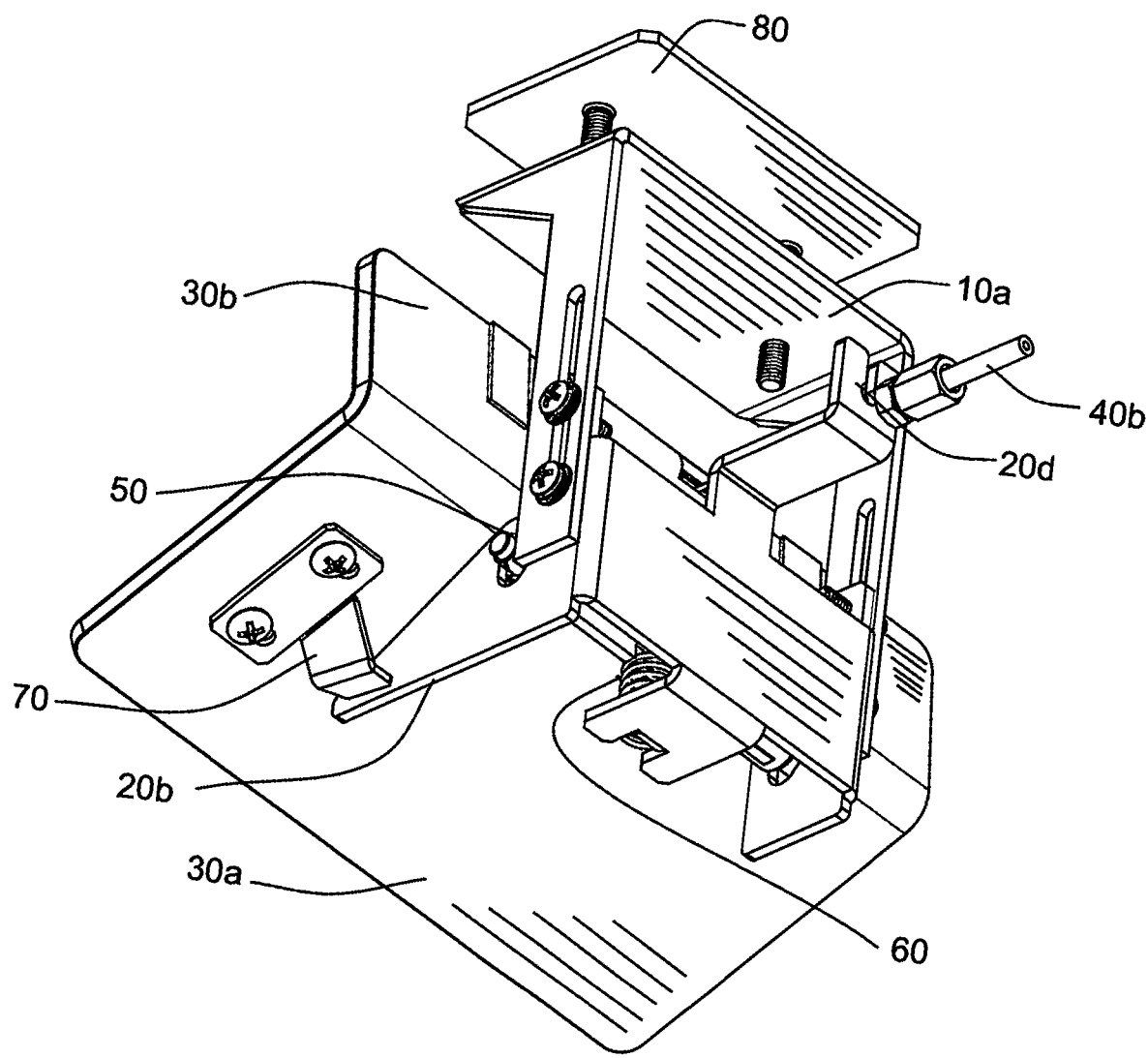
FIG. 4 is an isometric view of the foot pedal according to this invention, viewing from the bottom thereof, in a pushed position.
Figure 6:
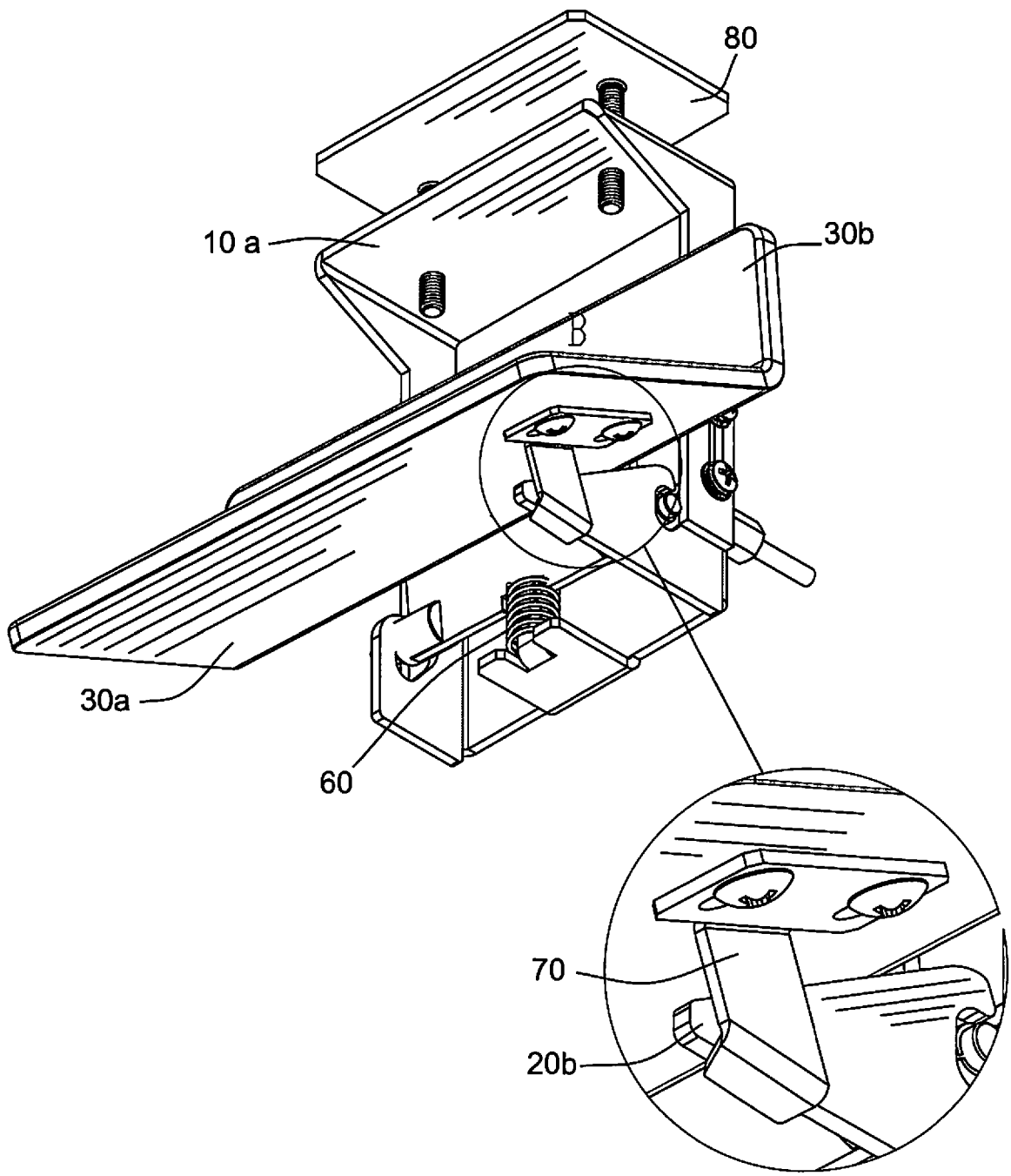
FIG. 6 is an isometric view of the foot pedal according to this invention, viewing from the bottom thereof, in a locked position.

Still viewing FIG. 1, numeral 70 indicates a latch. When the foot pedal according to this invention is fully assembled, Latch 70 is disposed on the bottom surface of Long Side 30*a* (as shown in FIGS. 2, 4 and 6, which also show Latch 70 comprising an L-shaped member). Latch 70 is aligned and adapted to engage with Catch 20*b*.

When the foot pedal according to this invention is fully assembled, Valve Control Cable 40*b* is threaded through Valve Control Cable Support 20*d* (as shown in FIG. 2 through 7).

Numeral 80 indicates a top plate. Top Plate 80 is adapted for mating with Horizontal Plate 10*a* for installing the foot pedal according to this invention inside a cabinet. Top Plate 80 and Horizontal Plate 10*a* have aligned holes and a pair of threaded bolts connecting Top Plate 80 and Horizontal Plate 10*a*, as shown in FIG. 2 through 7. The distance between Top Plate 80 and Horizontal Plate 10*a* can be adjusted as needed for a particular installation by way of the threaded bolts.

Still viewing FIG. 1, first and second wing members are shown to have a pair of holes each. As shown in FIG. 2 through 7, the holes in the wing members receive machine screws through Elongated Openings 10*c* for affixing of Legs 10*b* to the first and second wing members. This allows adjustment of the relative vertical positions of Top Housing 10 and Bottom Housing 20, as needed for a particular installation.

Figure 3:
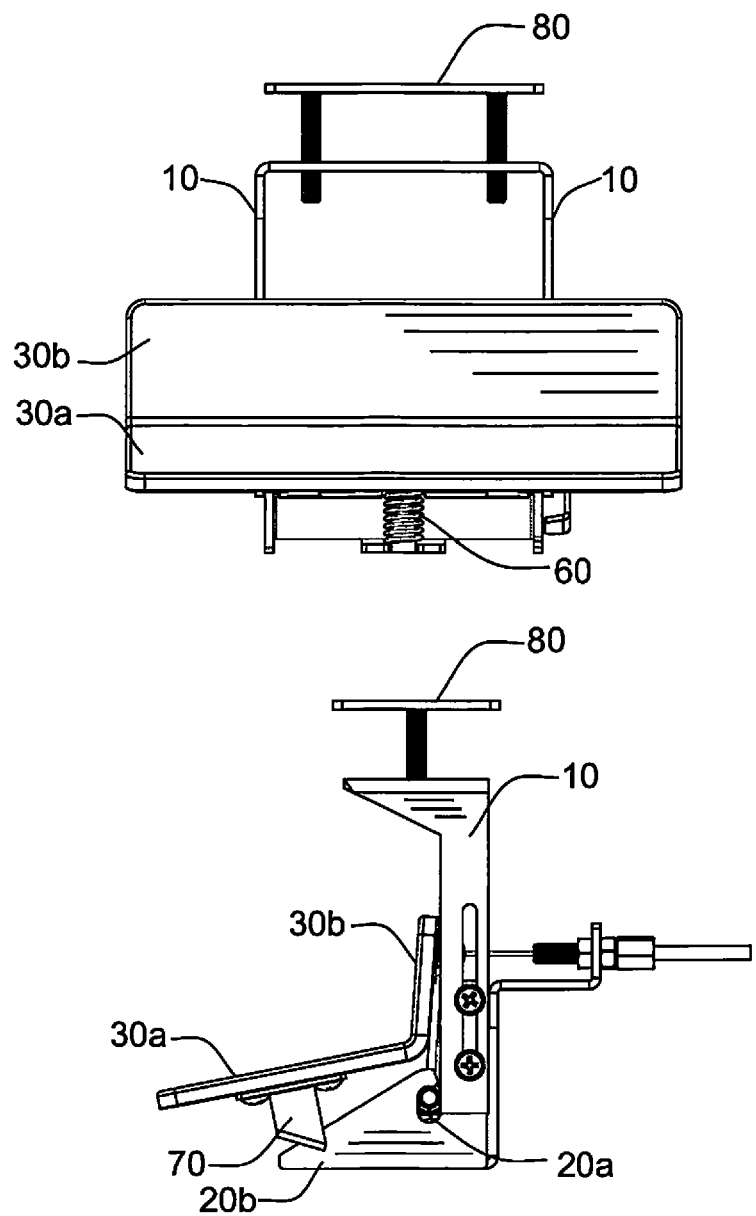
FIG. 3 shows, in the upper portion thereof, a front view of the foot pedal according to this invention in the rest position.

Viewing now FIGS. 2 and 3, Latch 70 has the free end of its L-shaped member abutting Catch 20*b*. Foot Pedal 30, biased by Spring 60, is in the rest position, i.e. in its uppermost position. Long Side 30*a* is substantially horizontal, without tilting left or right, as best viewed in the upper portion of FIG. 3. The lower portion of FIG. 3 shows that there is no pulling on Valve Control Cable 40*b* (i.e. Valve Control Cable 40*b* is released and the water faucet valve is closed).

Figure 5:
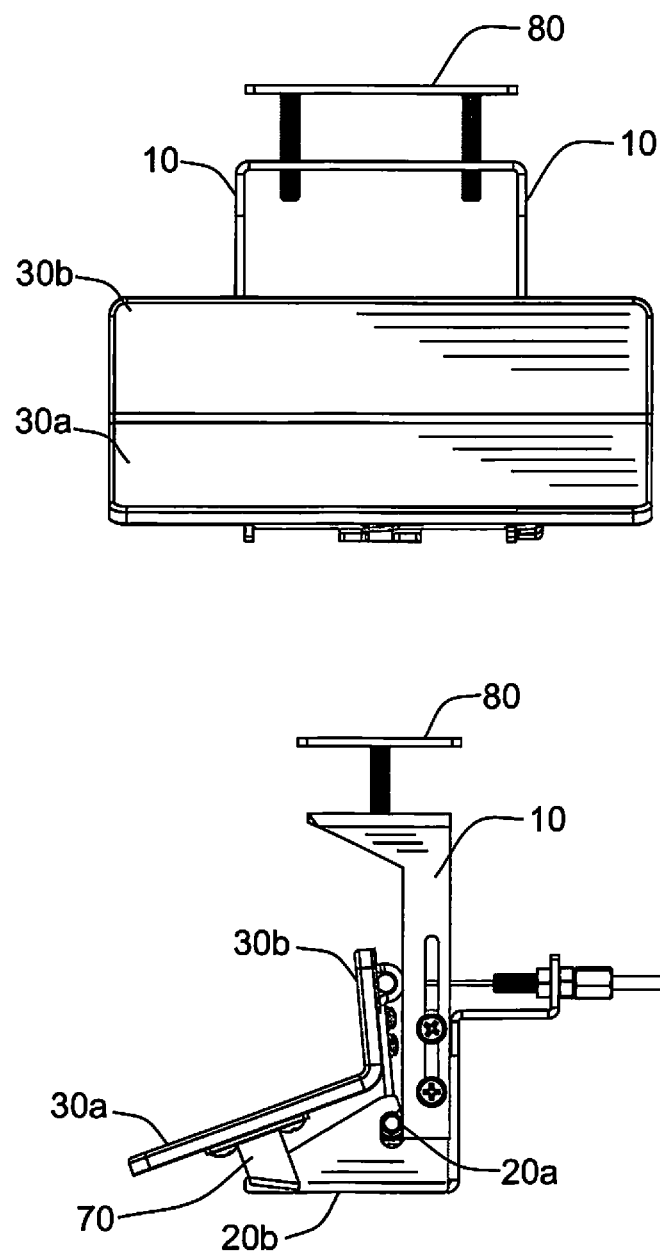
FIG. 5 shows, in the upper portion thereof, a front view of the foot pedal according to this invention in the pushed position.

Viewing now FIGS. 4 and 5, in the pushed position Latch 70 still has the free end of its L-shaped member abutting Catch 20*b*. Foot Pedal 30 is pushed by the user at a first location, which is between the middle of Long Side 30*a* and the farthest from Latch 70. In the upper portion of FIG. 5, the first location is between the middle and the left of Long Side 30*a*.

The lower portion of FIG. 5 shows that Valve Control Cable 40*b* is pulled (i.e. the water faucet valve is open and water flows as long as the user continues depressing Foot Pedal 30 at the first location).

Figure 7:
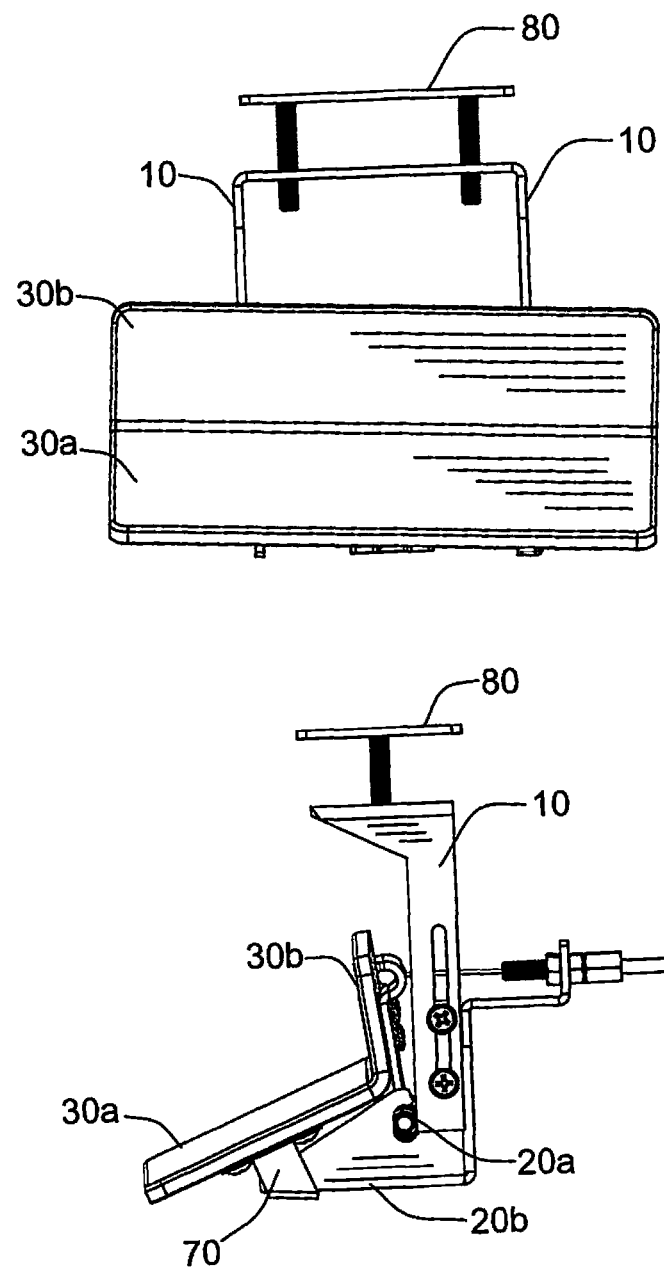
FIG. 7 shows, in the upper portion thereof, a front view of the foot pedal according to this invention in the locked position.

Viewing now FIGS. 6 and 7, in the locked position Latch 70 has the free end of its L-shaped member overlapping and engaging with Catch 20*b*. This overlapping and engaging of the L-shaped member with Catch 20*b* occurs because Spring 60 permits a rocking motion of Foot Pedal 30 in the horizontal plane about Spring 60, causing Long Side 30*a* to tilt left or right. When Foot Pedal 30 is pushed near Latch 70, Long Side 30*a* is tilted, causing the L-shaped member to overlap and engage with Catch 20*b*.

Specifically, Foot Pedal 30 is pushed by the user at a second location, which is near Latch 70. In the upper portion of FIG. 7, the first location is on the right of Long Side 30*a*, which also shows Long Side 30*a* tilted to the right. The lower portion of FIG. 7 shows that Valve Control Cable 40*b* is pulled (i.e. the water faucet valve is open and water flows without the user depressing Foot Pedal 30).

While the present invention has been described and defined by reference to the preferred embodiment of the invention, such reference does not imply a limitation on the invention, and no such limitation is to be inferred. The invention is capable of considerable modification, alteration, and equivalents in form and function, as will occur to those ordinarily skilled and knowledgeable in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

We claim:

1. A foot pedal mechanism for actuating a water faucet valve, the foot pedal mechanism comprising a long side adapted for depressing and releasing the foot pedal with a user's foot and a short side disposed perpendicularly to the long side, whereas the short side pulls and releases a valve control cable, causing opening and closing the water faucet valve and whereas the foot pedal can be selectively placed from a rest position to either a pushed position or a locked position by way of depressing the foot pedal at, respectively, first or second locations on the foot pedal, such that in the rest position the water faucet valve is closed, in the pushed position the water faucet valve is open as long as the user continues depressing the foot pedal, in the locked position the water faucet valve is open without the user continuously depressing the foot pedal;

whereas the foot pedal mechanism for actuating a water faucet valve further comprising:

a top housing comprising a horizontal plate and two rectangular vertical legs disposed on either end of the horizontal plate;

a bottom housing comprising a rectangular vertically oriented base plate comprising top and bottom edges and first and second vertical edges, a first wing member disposed on the first vertical edge perpendicularly to the base plate, a second wing member disposed on the second vertical edge perpendicularly to the base plate and forming a catch, whereas the first and second wing members comprise aligned vertically oriented open-ended slots, each slot adapted for receiving a bushing, whereas the legs affixed to the first and second wing members, such that the legs partially cover the open-ended slots, thus forming vertically oriented closed slots;

a pedal support plate comprising top and bottom portions, the valve control cable affixed to the top portion, a pivot pin disposed on the bottom portion, the pivot pin inserted into bushings, whereas the short side fixedly attached to the pedal support plate for pivotal movement of the foot pedal about the pivot pin;

a spring support disposed on the bottom edge, a spring disposed on the spring support, such that the spring is biasing the foot pedal towards the rest position and permitting a rocking motion of the foot pedal in the horizontal plane about the spring, said rocking motion limited by the travel of the bushings inside the vertically oriented closed slots;

a latch disposed on a bottom surface of the long side, the latch aligned and adapted to engage with the catch, whereas the second location is near the latch and the first location is between the middle of the long side and the farthest from the latch.

2. A foot pedal mechanism for actuating a water faucet valve as in claim 1 wherein the latch comprising an L-shaped member, whereas a free end of the L-shaped member abutting the catch in the rest and pushed positions and overlapping the catch in the locked position.

3. A foot pedal mechanism for actuating a water faucet valve as in claim 2 further comprising a valve control cable support disposed on the top edge and adapted for threading the valve control cable therethrough.

4. A foot pedal mechanism for actuating a water faucet valve as in claim 3 further comprising elongated openings disposed vertically on the legs, the elongated openings adapted for adjusting the relative vertical positions between the top and bottom housings.

5. A foot pedal mechanism for actuating a water faucet valve as in claim 4 further comprising a top plate adapted for mating with the horizontal plate for installing the foot pedal for actuating a water faucet valve inside a cabinet.

6. A foot pedal mechanism for actuating a water faucet valve as in claim 5, further comprising two notches disposed on the bottom portion, the notches receiving the spring.

\* \* \* \* \*